(No Model.)

W. H. TAYLOR.
TOOL FOR FORMING KEY SLOTS.

No. 487,701. Patented Dec. 6, 1892.

Witnesses
Louis G. Julihn
C. P. Elwell

Inventor
W. H. Taylor.
By Hopkins & Atkins.
Attorneys

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

TOOL FOR FORMING KEY-SLOTS.

SPECIFICATION forming part of Letters Patent No. 487,701, dated December 6, 1892.

Application filed May 7, 1891. Renewed October 26, 1892. Serial No. 450,073. (No model.)

*To all whom it may concern:*

Be it known that I, WARREN H. TAYLOR, of Stamford, county of Fairfield, and State of Connecticut, have invented a certain new and useful Tool for Forming Key-Slots in Locks, of which the following is a specification, reference being had to the accompanying drawings.

The object of my invention is to produce a tool that is an improvement on the one described in my patent, No. 267,808, of November 21, 1882. The tool described in that patent is intended to produce only a sinuous key-slot of uniform width throughout its depth.

I have now devised an improved broach or tool which enables me to cut keyways of a form which gives much greater security to locks in which they are employed.

My improved broach is adapted to make a sinuous keyway narrower at some points than at others, and therefore more obstructive to a picking-tool by forming projections from its side walls extending to or past the central line of the keyway. It consists of a suitable cutting-blade having an angular recess or angular recesses in its side or sides.

Figure 2:
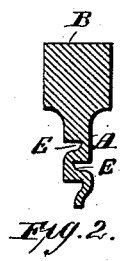
Figure 1:
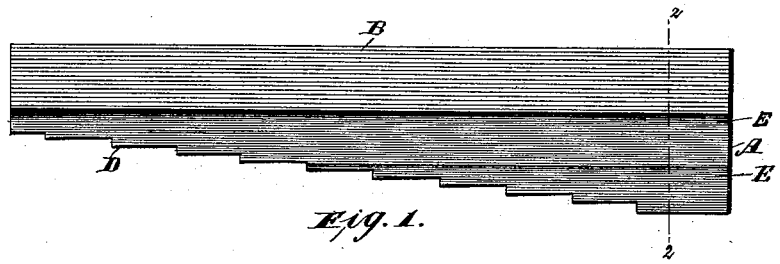
Figure 4:
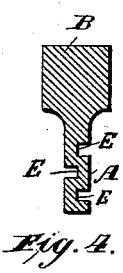
Figure 3:
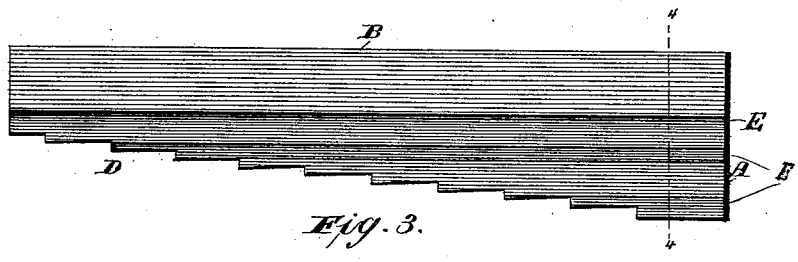

In the accompanying drawings, Figure 1 is a side elevation of a broach for producing one form of key-slot; and Fig. 2, a cross-section of the same, taken on the line 2 2 of Fig. 1. Fig. 3 is a side elevation of a broach for producing another form of key-slot, and Fig. 4 a cross-section of the same on line 4 4 of Fig. 3.

Referring to the letters on the drawings, A indicates the blade of the broach provided with a back or rib B, that may be integral with the blade or of a separate part. The blade of the broach should be formed of suitably-hardened metal and the proper shape may be imparted to it before it is hardened. A blank may first be made and may be provided by cutting or otherwise with a tapered edge, upon which may be formed in any suitable manner teeth D. These teeth may be of different widths, as shown.

E indicates an angular recess formed in any suitable manner upon the side of the blade. It may be of any desired width and at any angle to the blade and may be formed on one or both sides, as desired.

My broach is adapted to be operated by hand or by machinery in the same manner as suggested in my patent above referred to.

In use the blade is caused to reciprocate evenly across the face of the metal to be cut, the cutting process being begun at the lowest point of the tapered edge. As the cutting progresses the tool is advanced farther and farther into the metal until all the teeth upon the several cutting-edges come into operation, when the desired recesses in the projections from the side walls of the keyway will be produced.

What I claim is—

1. A broach consisting of a back or rib provided with a cutting-blade having alternating angular recesses on opposite sides thereof and terminating at its cutting-edge in a stepped series of cutting-teeth, substantially as shown and described.

2. A broach-blade provided with a tapering toothed edge sinuous in cross-section and having an angular recess in its side, substantially as set forth.

3. A broach consisting of a back or rib provided with a blade extending at right angles therefrom, said blade being of irregular sinuous cross-section and having a stepped series of cutting-teeth, substantially as shown and described.

In testimony of all which I have hereunto subscribed my name.

WARREN H. TAYLOR.

Witnesses:
SCHUYLER MERRITT,
GEO. E. WHITE.